United States Patent
Sato

(10) Patent No.: US 7,184,223 B2
(45) Date of Patent: Feb. 27, 2007

(54) IMAGING LENS INCLUDING LIGHT BLOCKING REGION AND METHOD OF MAKING IT

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 155 days.

(21) Appl. No.: 11/061,437

(22) Filed: Feb. 22, 2005

(65) Prior Publication Data

US 2005/0195501 A1    Sep. 8, 2005

(30) Foreign Application Priority Data

Mar. 4, 2004   (JP)   ............................. 2004-060180

(51) Int. Cl.
*G02B 9/02* (2006.01)
(52) U.S. Cl. ...................... 359/738; 359/739
(58) Field of Classification Search ................ 359/738, 359/739, 740; 348/340
See application file for complete search history.

(56) References Cited

U.S. PATENT DOCUMENTS 6,239,922 B1 *   5/2001   Nakamura .................. 359/739
6,693,748 B1 *   2/2004   Fujimoto et al. ........... 359/621
6,898,027 B2 *   5/2005   Yamada et al. ............. 359/796

FOREIGN PATENT DOCUMENTS

JP        6-64218     9/1994
JP        2507166     4/1996

* cited by examiner

*Primary Examiner*—David N. Spector
(74) *Attorney, Agent, or Firm*—Arnold International; Jon W. Henry; Bruce Y. Arnold

(57) ABSTRACT

An imaging lens includes at least one lens element having a surface that includes: a light transmitting region that transmits incident light; a second region; a step that extends in a direction generally parallel to a normal to said surface, that connects the light transmitting region to the second region, and that forms a boundary between the light transmitting region and the second region; and a light blocking coating that covers the entire second region. The entire surface of the second region, or only a portion thereof, may project or be recessed from the surface of the light transmitting region. The second region may extend completely or partially around the light transmitting region, and may function as an aperture stop, a field stop, or other stop. A method of manufacturing such a lens element is also disclosed.

13 Claims, 3 Drawing Sheets

IMAGING LENS INCLUDING LIGHT BLOCKING REGION AND METHOD OF MAKING IT

FIELD OF THE INVENTION

The present invention relates to an imaging lens for installation in a relatively compact imaging device and to a method of manufacturing a lens which forms part of the imaging lens.

BACKGROUND OF THE INVENTION

In general, imaging lenses installed in imaging devices, such as photographic film cameras, digital cameras, and video cameras include a stop that blocks incident light and that is either fixed or variably positioned. Such a stop may be an aperture stop that controls the amount of light being transmitted by the imaging lens at any instant or a field stop that defines, for example, the angle of view (field angle) of the imaging lens. An aperture stop may be termed a brightness stop and may be variable as an iris diaphragm. The aperture stop controls the diameter of the light beam at one position along the optical axis of the imaging lens and may affect resolution, contrast, and other features of an image formed by the imaging lens. On the other hand, a field stop or field diaphragm functions to limit the field of view or field angle, which is a factor in determining imaging performance, and is usually designed to form a sharp edge to the field of view with a desired size and shape of the image. Besides aperture stops and field stops, other types of stops are intended to prevent or minimize flare and ghosting. In general, these may be referred to as flare cutting stops or by similar language. Hereinafter, any such structures generally that have the function of controlling the light passing through a lens system will be referred to as a "stop."

Ordinarily stops, especially aperture stops, are constructed of mechanical components and are a separate component from any lens. A field stop and a flare cutting stop are also often constructed of masking members that are separate from lenses. On the other hand, Japanese Laid-Open Utility Model Application H06-64218 and Japanese Patent No. 2507166 describe methods of providing flare cutting stops without separately installing any masking member. In particular, Japanese Laid-Open Utility Model Application H06-64218 describes an objective lens that forms a light blocking pattern that is used as a flare cutting stop by printing or coating the pattern on a lens surface, and Japanese Patent No. 2507166 describes a projection television equipped with a projection lens that forms a light blocking pattern that is used as a flare cutting stop by printing the pattern on a lens surface.

Because imaging devices, such as those mentioned above, have been made much smaller in recent years, miniaturization of their lens systems in particular has progressed by reducing their total lengths and outer diameters. Especially, imaging lenses of modular cameras for inputting images to portable phones and similar devices that have rapidly become popular, are becoming extremely compact. In imaging lenses of such portable cameras, because the diameters of the incident light beams are extremely small, the thicknesses of the stop members become large relative to the diameters of the incident light beams, in contrast to most imaging lenses, and thus flare and ghosting occur more easily due to reflection and other factors at the surfaces and edges of the member that defines the stop and the aperture of the stop. Especially for recent highly compact imaging lenses, the thickness of mechanical members that are used, for example, as aperture stops cannot be ignored in miniaturizing the lenses.

On the other hand, aperture stops in imaging lenses of portable cameras and similar devices are often made to be fixed stops in order to simplify the construction. It is considered preferable to use fixed stops in general that enable miniaturization and prevent flare by using a light blocking pattern, such as those described in the previously mentioned Japanese Laid-Open Utility Model Application H06-64218 and Japanese Patent No. 2507166, instead of using mechanical stop members. In this case, because the lens surface is directly coated with light blocking paint or similar material, and a light blocking pattern which operates as a stop is formed by coating the light blocking material without requiring the use of separate stop members, the occurrence of flare and ghosting can be prevented. Also, not using a separate stop member assists in achieving miniaturization.

However, imaging lenses of portable cameras have progressed even further in terms of miniaturization. Hence, in directly printing or otherwise adhering a light blocking paint on a lens surface, it becomes difficult to precisely form a light blocking pattern, which may present manufacturing problems. Note that in the lenses described in Japanese Laid-Open Utility Model Application H06-64218 and Japanese Patent No. 2507166, lens systems such as single-lens reflex cameras and projection lenses that are relatively large compared with portable cameras are generally considered, and the problems specific to compact imaging lenses are not specifically considered.

BRIEF SUMMARY OF THE INVENTION

The present invention relates to an imaging lens in which a stop made of a light blocking pattern is formed with high dimensional precision on a lens surface, and the imaging lens operates with improved control of flare and improved miniaturization compared to imaging lenses in general. Additionally, the present invention relates to a method of easily manufacturing a lens with such a lens surface and stop for an imaging lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Embodiments of the present invention will now be described with reference to FIGS. 1–6.

Figure 1:
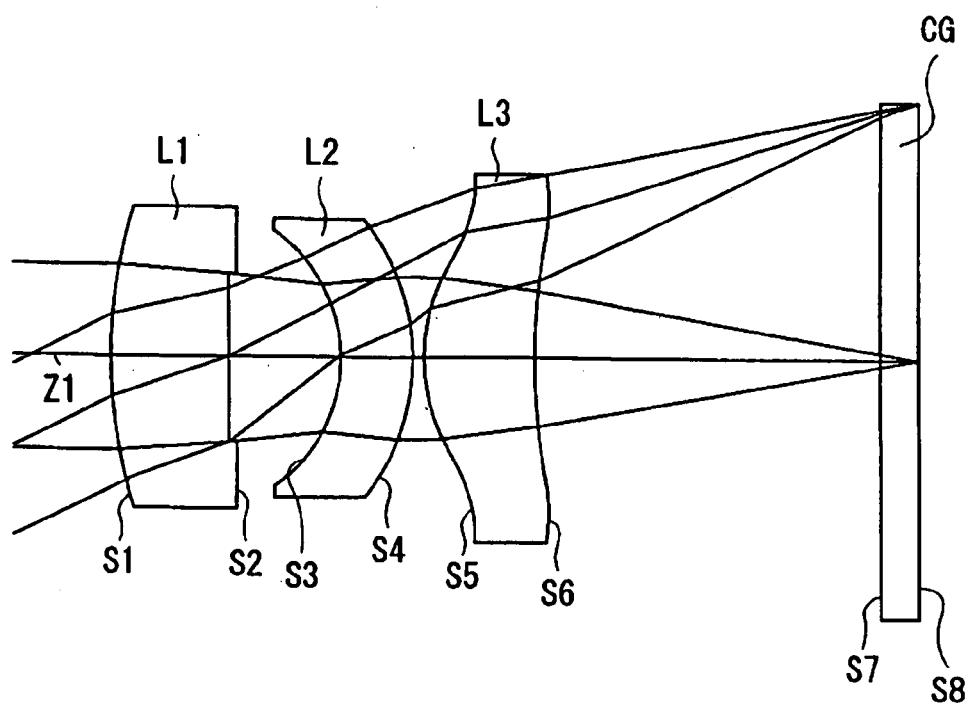
FIG. 1 shows a cross-sectional view of an imaging lens that includes a lens element with a stop according to Embodiment 1 of the present invention.

FIG. 1 shows a cross-sectional view of an imaging lens that includes a lens element with a stop according to Embodiment 1 of the present invention. In FIG. 1, lens elements are referenced by the letter L followed by a number denoting their order from the object side of the projection lens, L1, L2, and L3, and CG denotes a cover glass. Also, in FIG. 1, the lens surfaces of all the optical elements are referenced by the letter S followed by a number denoting their order from the object side of the projection lens, from S1 to S8.

The imaging lens shown in FIG. 1 may be used in a portable modular camera that uses an imaging element, such as a CCD (Charge Coupled Device) or CMOS (Complementary Metal Oxide Semiconductor), or it may be used in digital cameras or similar devices. The imaging lens includes a first lens element L1, a second lens element L2, and a third lens element L3 installed along an optical axis Z1 sequentially from the object side. On the image forming plane (imaging plane) of this imaging lens, at surface S8, the imaging element (not shown in the drawings), such as a CCD or CMOS, is placed. The cover glass CG protects the image forming plane where the CCD or CMOS is located. Furthermore, between the third lens element L3 and the image forming plane (imaging plane), optical components other than the cover glass CG, such as an infrared cut-off filter and/or a lowpass filter, may also be placed. Here, the image-side face S8 of the cover glass CG essentially coincides with the image forming plane (imaging plane) of the imaging lens.

The first lens element L1 has a plano-convex shape at least near the optical axis so as to have positive refractive power near the optical axis, and it has its convex surface on the object side. The object-side surface S1 may have an aspheric shape. The second lens element L2 is a meniscus lens element with its concave surface on the object side and has negative refractive power. Also, at least one of the surfaces S3 and S4 may have an aspheric shape. The third lens element L3 may have, for example, aspheric surfaces on both sides, a meniscus shape with its convex surface on the object side, and positive refractive power at least near the optical axis.

Also, in the imaging lens, at least one surface (surface S2 as shown in FIG. 1) of the first through third lens elements, L1 through L3, includes a light transmitting region that transmits incident light, a second region that functions to block incident light and extends completely around the light transmitting region so as to block peripheral portions of an incident light beam, and further includes a step that extends in a direction generally parallel to a surface normal of the at least one surface, that connects the light transmitting region to the light blocking region, and that defines a boundary between the light transmitting region and the second region, as will be further described below.

Figure 2A:
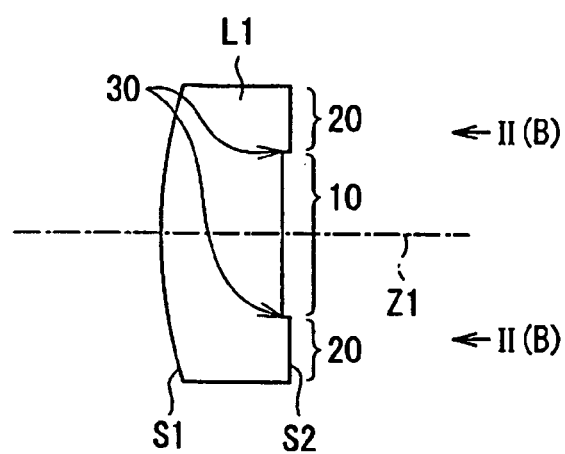
FIG. 2A shows a cross-sectional view of the lens element with a stop according to Embodiment 1 of FIG. 1.
Figure 2B:
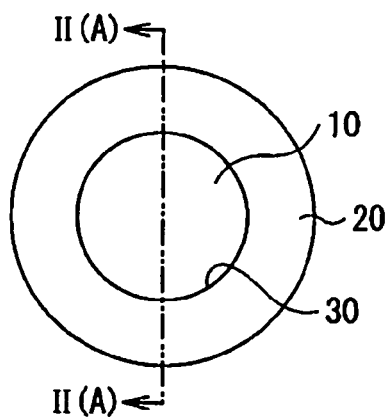
FIG. 2B shows a plan view of the lens element with a stop according to Embodiment 1 of FIG. 1.

FIG. 2A shows a cross-sectional view of the lens element with a stop according to Embodiment 1 of FIG. 1, and FIG. 2B shows a plan view of the lens element with a stop according to Embodiment 1 of FIG. 1 from the direction of arrows II(B) shown in FIG. 2A. As shown in FIGS. 2A and 2B, the image-side surface S2 of the first lens element L1 has a circular transmitting region 10 centered on the optical axis Z1, a ring-shaped second region 20 surrounding the light transmitting region 10, and a step 30 defining the boundary between the light transmitting region 10 and the second region 20. A coating having a light blocking ability is formed on the second region 20 after the step 30 has been formed. Black lacquer paint may be used, for example, as the coating material. Also, the height or depth of the step 30 in a direction generally parallel to a surface normal of the surface S2 should desirably be about 0.05 mm to 0.1 mm. In the embodiment illustrated in FIG. 2A, the second region 20 projects in the direction normal to surface S2 toward the image side from the light transmitting region 10. With this construction, a light blocking coating can rather easily be formed only on the second region 20, that is, without any light blocking coating being inappropriately applied to the light transmitting region 10. The second region 20 with the light blocking coating applied functions as an aperture stop that blocks the peripheral portions of incident light beams so that the peripheral portions do not emerge through the surface S2. The first lens element L1 may be made of an optical glass or a plastic material. However, for ease of processing the surface S2, it is preferable to use a plastic material. Also, as can be understood from FIGS. 2A–2B, the geometrical center of the light transmitting region 10 is on the optical axis Z1 of the imaging lens.

The first lens element L1 of the imaging lens is constructed so that it includes the step 30 that defines the boundary between the light transmitting region 10 and the second region 20. Then a coating that blocks light is formed over the entire surface of the second region 20, and the step forms a boundary between the light transmitting region and the light blocking region.

In the imaging lens of Embodiment 1, as shown in FIG. 1, light incident on the surface S1 of the first lens element from the object side, L1, has its peripheral portion blocked by the coating on the second region 20 of the surface S2. Light emerging through the light transmitting region 10 without being blocked by the coating advances while converging toward the second lens element L2. The on-axis light beam diameter is limited by the light blocking coating on the surface S2 without generating flare or ghosting, and adjustments of brightness, resolution, and contrast are performed. The emergent light from the light transmitting region 10 is transmitted by the second lens element L2 and advances as converging light toward the third lens element L3. Light transmitted by the second lens element L2 is further transmitted by the third lens element L3 and converges onto the image forming plane at surface S8 via an image-side surface S6.

In this way, according to the imaging lens of Embodiment 1, because a step 30 that defines the boundary between the light transmitting region 10 and the second region 20 is installed on the surface S2, an aperture stop of highly precise dimensions can be more easily formed (as compared with the case where no step is installed). Namely, compared with the case of forming an opening by directly patterning a coating having an opening of a specified shape on a lens surface having no step, by first forming a step of highly precise dimensions by processing the lens surface, it becomes possible to form a highly precise aperture stop using such a step. Also, the total number of components of the imaging lens can be reduced as compared to installing an aperture stop as a separate optical member, which is advantageous in terms of miniaturization and cost reduction. Furthermore, because a very thin coating can be formed on the second region 20 in order to block incident light, it is possible to suppress the occurrence of flare and ghosting due to reflection and other occurrences at the light incident end of the aperture stop in order to obtain excellent images.

Furthermore, problems of cutting off peripheral light rays at the light incident end of the aperture stop are largely eliminated, improving the imaging properties related to peripheral light rays.

Figure 3:
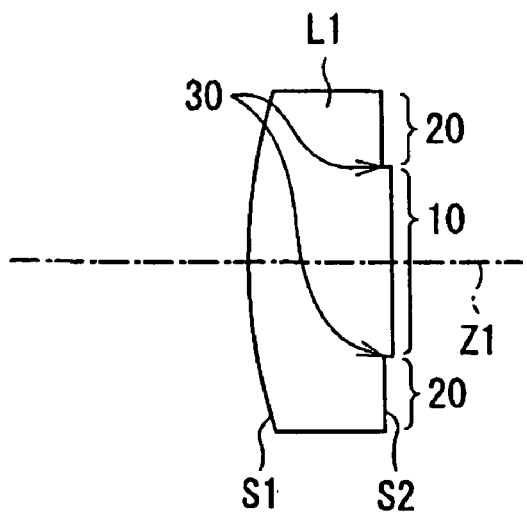
FIG. 3 shows a cross-sectional view of a lens element with a stop according to Embodiment 2.

Although the present invention was explained with reference to Embodiment 1 and FIG. 1 as described above, the present invention is not limited to this embodiment and the descriptions above, and various modifications are possible. For example, although in Embodiment 1 the surface of the second region projects from the surface of the light transmitting portion in the direction normal to the surface S2, conversely, the surface of the second region can be constructed so as to be recessed from the surface of the light transmitting portion in the direction normal to the surface S2. Specifically, FIG. 3 shows a cross-sectional view of a lens element with a stop according to Embodiment 2 that is constructed so that the surface S2 has the surface of the second region 20 recessed from the surface of the light transmitting region 10 in the direction normal to the surface S2.

Figure 4A:
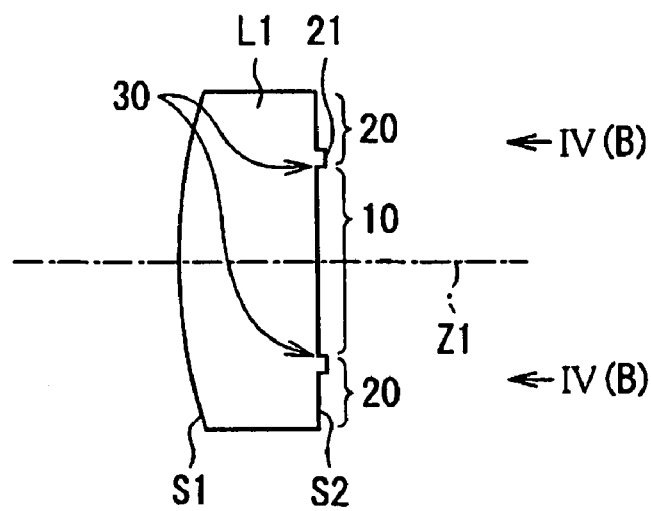
FIG. 4A shows a cross-sectional view of a lens element with a stop according to Embodiment 3.
Figure 4B:
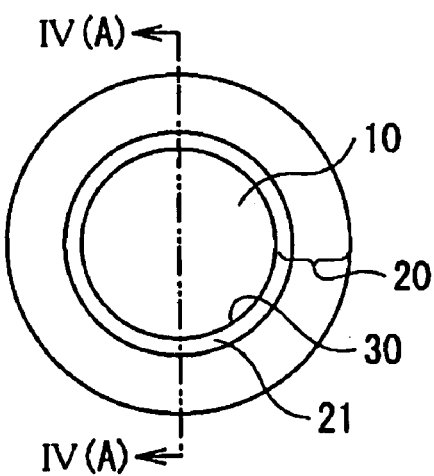
FIG. 4B shows a plan view of a lens element with a stop according to Embodiment 3.
Figure 5:
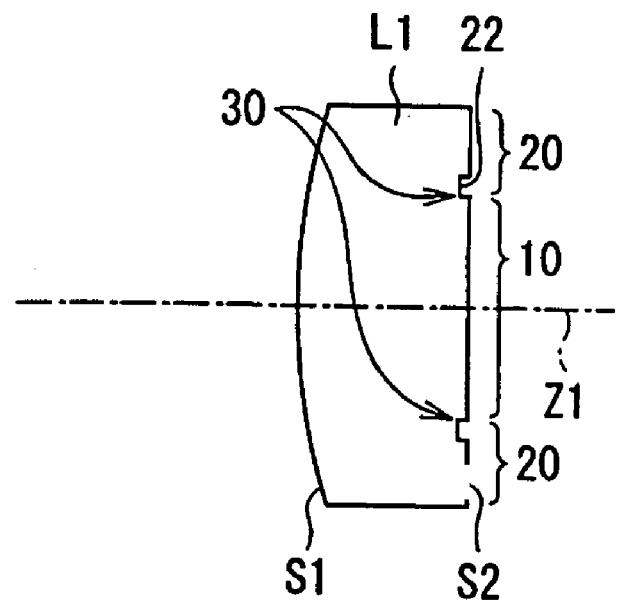
FIG. 5 shows a cross-sectional view of a lens element with a stop according to Embodiment 4.

Also, although in Embodiments 1 and 2 described above the entire surface of the second region is displaced from the surface of the light transmitting region in a direction normal to the surface S2, it may be constructed so that a portion of the surface of the second region is displaced from other portions of the surface of the second region and from the surface of the light transmitting region in a direction normal to the surface S2 in order to form a step that extends completely around the light transmitting region. Specifically, FIG. 4A shows a cross-sectional view of a lens element with a stop according to Embodiment 3, and FIG. 4B shows a plan view of the lens element with a stop according to Embodiment 3 from the direction of arrows IV(B) shown in FIG. 4A. As shown in FIGS. 4A–4B, in Embodiment 3, a portion 21 of the surface of the second region projects from other portions of the surface of the second region 20 in a direction normal to the surface S2 as well as from the surface of the light transmitting region 10, with the second region extending completely around the optical axis Z1 and the center of the portion 21 being coincident with the optical axis Z1. Here, the projecting portion 21 forms the step 30 that defines the boundary between the light transmitting region 10 and the second region 20. Note that FIGS. 4A–4B correspond to FIGS. 2A–2B. Alternatively, in Embodiment 4 of the present invention, as shown in FIG. 5, a portion 22 of the surface of the second region may be recessed from other portions of the surface of the second region 20 in a direction normal to the surface S2 as well as from the surface of the light transmitting region 10, with the second region extending completely around the optical axis Z1 and the center of the portion 22 being coincident with the optical axis Z1. Here again, the recessed portion 22 forms the step 30 that defines the boundary between the light transmitting region 10 and the second region 20. In Embodiments 2–4, as in Embodiment 1, a stop having more precise dimensions can be easily realized compared to when no step is installed.

Figure 6:
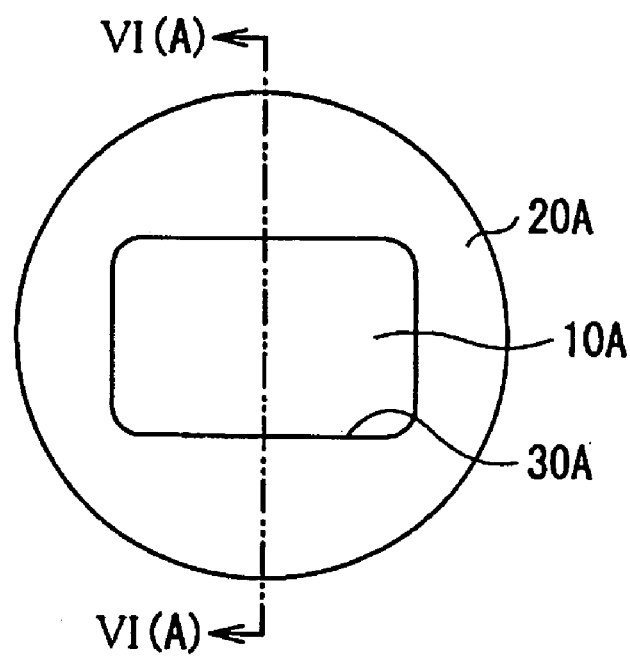
FIG. 6 shows a plan view of a lens element with a stop according to Embodiment 5.

Additionally, although in Embodiments 1–4 described above the second region functions as an aperture stop to block the peripheral portion of incident light beams, the present invention is not limited to this arrangement. For example, FIG. 6 shows a plan view of a lens element with a stop according to Embodiment 5 where a second region 20A that may function as a field stop is formed on a lens surface. In this case, the specified lens surface includes a light transmitting region 10A having approximately a rectangular shape, a second region 20A surrounding this light transmitting region 10A, and a step 30A which defines the boundary between the light transmitting region 10A and the second region 20A. A coating that blocks light is formed over the entire second region 20A. This second region 20A defines the field of view to be imaged and functions to block light incident from outside the field of view from reaching the imaging element. The shape of the periphery of the light transmitting region 10A is not limited to that shown in FIG. 6 but may be varied as desired. Furthermore, the present invention can be applied to stops in general which limit incident light beams, including flare cutting stops. Also, the present invention applies not only when the second region extends completely around the light transmitting region, but it also applies to devices when the second region extends only partially around the light transmitting region.

Additionally, the surface on which the second region and the light transmitting region whose boundary is defined by a step are installed may be a spherical lens surface or an aspheric lens surface. Also, the specific example of Embodiment 1 describes an imaging lens of three-piece construction, but the present invention is not limited to this. It may be a single lens element or constructed of two, four or more lens elements.

Also, as the material used for the coating that is applied to the second region, other paints than lacquer paint may be used if they have light blocking ability and can be applied to a lens surface. Also, the coating does not have to be black.

Furthermore, the present invention is not limited to the aforementioned embodiments and the variations described above, as it will be obvious that various alternative implementations are possible. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. An imaging lens having an optical axis and comprising at least one lens element, wherein:
   at least one surface of the at least one lens element includes
   a light transmitting region that transmits incident light,
   a second region,
   a step that extends in a direction generally parallel to a surface normal to said at least one surface, said step connecting the light transmitting region to the second region and forming a boundary between the light transmitting region and the second region; and
   a coating that blocks light covers the entire second region, but does not cover said step forming said boundary.

2. The imaging lens of claim 1, wherein the second region extends completely around the light transmitting region.

3. The imaging lens of claim 1, wherein the geometrical center of the light transmitting region is on the optical axis of the imaging lens.

4. The imaging lens of claim 1, wherein the entire second region is displaced in a direction along the optical axis from the light transmitting region.

5. The imaging lens of claim 2, wherein the entire second region is displaced in a direction along the optical axis from the light transmitting region.

6. The imaging lens of claim 3, wherein the entire second region is displaced in a direction along the optical axis from the light transmitting region.

7. The imaging lens of claim 1, wherein a portion of the second region projects from other portions of the second region, as well as from the light transmitting region.

8. The imaging lens of claim 2, wherein a portion of the second region projects from other portions of the second region, as well as from the surface of the light transmitting region.

9. The imaging lens of claim 3, wherein a portion of the second region projects from other portions of the second region, as well as from the surface of the light transmitting region.

10. The imaging lens of claim 1, wherein the second region with coating functions as an aperture stop.

11. The imaging lens of claim 4, wherein the second region with coating functions as an aperture stop.

12. The imaging lens of claim 7, wherein the second region with coating functions as an aperture stop.

13. A method of manufacturing a lens element that includes a light transmitting region for transmitting incident light and a second region on one surface of the lens element, comprising the following steps performed in the order indicated:
  (a) forming a step that extends in a direction normal to the one surface of the lens element and that connects the light transmitting region to the second region; and
  (b) coating the entire second region with a material that blocks light, while coating said step that connects the light transmitting region to the second region.

* * * * *

UNITED STATES PATENT AND TRADEMARK OFFICE
CERTIFICATE OF CORRECTION

| | |
|---|---|
| PATENT NO. | : 7,184,223 B2 |
| APPLICATION NO. | : 11/061437 |
| DATED | : February 27, 2007 |
| INVENTOR(S) | : Sato |

It is certified that error appears in the above-identified patent and that said Letters Patent is hereby corrected as shown below:

<u>In claim 13</u>
at line 12, change "while coating" to -- while not coating -- .

Signed and Sealed this

First Day of May, 2007

JON W. DUDAS
*Director of the United States Patent and Trademark Office*